United States Patent
Kodama et al.

(10) Patent No.: US 10,655,725 B2
(45) Date of Patent: May 19, 2020

(54) LUBRICATING APPARATUS

(71) Applicant: KOMATSU LTD., Tokyo (JP)

(72) Inventors: Osamu Kodama, Komatsu (JP); Takuma Nishimura, Kanazawa (JP); Kyousuke Moriguchi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 170 days.

(21) Appl. No.: 15/568,038

(22) PCT Filed: Nov. 12, 2015

(86) PCT No.: PCT/JP2015/081860
§ 371 (c)(1),
(2) Date: Oct. 20, 2017

(87) PCT Pub. No.: WO2017/081791
PCT Pub. Date: May 18, 2017

(65) Prior Publication Data
US 2018/0135740 A1    May 17, 2018

(51) Int. Cl.
*F16H 57/04* (2010.01)

(52) U.S. Cl.
CPC ........... *F16H 57/04* (2013.01); *F16H 57/043* (2013.01); *F16H 57/0424* (2013.01); *F16H 57/0426* (2013.01)

(58) Field of Classification Search
CPC ............ F16H 57/0426; F16H 57/0424; F16H 57/043; F16H 57/04
USPC ........................................ 184/6.12
See application file for complete search history.

(56) References Cited

U.S. PATENT DOCUMENTS

| | | | | |
|---|---|---|---|---|
| 5,687,612 A | * | 11/1997 | Imamura | F16H 57/025 464/16 |
| 6,110,070 A | * | 8/2000 | Nagai | F16H 57/043 184/6.12 |
| 8,905,885 B2 | * | 12/2014 | Yamamoto | B60K 6/405 180/65.235 |

(Continued)

FOREIGN PATENT DOCUMENTS

| | | |
|---|---|---|
| CN | 103415727 A | 11/2013 |
| JP | S61-103665 U | 7/1986 |

(Continued)

*Primary Examiner* — Michael R Mansen
*Assistant Examiner* — Mark K Buse
(74) *Attorney, Agent, or Firm* — Faegre Drinker Biddle & Reath LLP

(57) ABSTRACT

A lubricating apparatus includes a lubricating oil supplying member disposed to face a tip surface of an input shaft. An axial oil passage and a radial oil passage are formed inside the input shaft and allow an outer circumferential surface of the input shaft having outer spline teeth and the tip surface to communicate with each other. A first supplied oil passage and a second supplied oil passage are formed inside the lubricating oil supplying member, a lubricating oil supplied to the axial oil passage flowing through the first supplied oil passage and the second supplied oil passage. The first supplied oil passage is provided with an inflow port, the lubricating oil flowing into the first supplied oil passage through the inflow port. The inflow port is open to an outer circumferential surface of the lubricating oil supplying member in a radial direction of the input shaft.

8 Claims, 5 Drawing Sheets

(56) References Cited

U.S. PATENT DOCUMENTS

| | | | | |
|---|---|---|---|---|
| 2007/0289816 | A1* | 12/2007 | Inoue | F16H 57/043 |
| | | | | 184/6 |
| 2013/0316866 | A1* | 11/2013 | Kawamura | F16H 57/027 |
| | | | | 475/160 |
| 2013/0327595 | A1* | 12/2013 | Moriguchi | F16H 57/045 |
| | | | | 184/6.12 |
| 2015/0080134 | A1* | 3/2015 | Tage | F16H 57/0426 |
| | | | | 464/7 |
| 2015/0292613 | A1* | 10/2015 | Tonokura | F16D 13/74 |
| | | | | 475/159 |
| 2016/0290480 | A1* | 10/2016 | Sada | F16H 57/0447 |

FOREIGN PATENT DOCUMENTS

| | | |
|---|---|---|
| JP | H03-123148 U | 12/1991 |
| JP | H04-83953 A | 3/1992 |
| JP | H08-230489 A | 9/1996 |
| JP | 2000-81115 A | 3/2000 |
| JP | 2002-227975 A | 8/2002 |
| JP | 2013-113305 A | 6/2013 |
| JP | 5626455 B2 | 11/2014 |
| JP | 2014-231339 A | 12/2014 |
| JP | 2015-102193 A | 6/2015 |
| JP | 2015-137733 A | 7/2015 |

\* cited by examiner

LUBRICATING APPARATUS

TECHNICAL FIELD

The present invention relates to a lubricating apparatus that lubricates a spline-fitted portion.

BACKGROUND ART

According to a conventional lubricating structure for a spline-fitted portion, it is common to form an axially extending hole inside a spline shaft having outer spline teeth formed on an outer circumferential surface thereof, introduce a lubricating oil into the hole from an end opposite to an end having the outer spline teeth, and supply the lubricating oil to the spline-fitted portion. There has also been proposed a structure of scraping up a lubricating oil by the rotation of a rotation shaft to cause droplets of the lubricating oil to adhere to a surface of a member, flowing down the droplets of the lubricating oil along the surface of the member and supplying the droplets of the lubricating oil to a spline-fitted portion (refer to, for example, Japanese Patent Laying-Open No. 2014-231339 (PTD 1)).

CITATION LIST

Patent Document

PTD 1: Japanese Patent Laying-Open No. 2014-231339

SUMMARY OF INVENTION

Technical Problem

In an apparatus including a spline-fitted portion, an axially extending oil passage for supplying a lubricating oil to the spline-fitted portion cannot in some cases be formed inside a shaft due to the structural constraints. In this case, a method for supplying the lubricating oil to the spline-fitted portion by flowing down, dropping or splashing the lubricating oil from the outer circumferential side of the spline-fitted portion is adopted. However, as the rotation speed of the spline shall increases, the centrifugal force caused by the rotation increases. Therefore, even if an attempt is made to supply the lubricating oil from the outer circumferential side to the spline-fitted portion, the lubricating oil is blown off by the rotation of the spline shaft, and thus, it becomes difficult to sufficiently lubricate the spline-fitted portion.

An object of the present invention is to provide a lubricating apparatus that can supply a sufficient amount of lubricating oil to a spline-fitted portion.

Solution to Problem

A lubricating apparatus according to the present invention is an apparatus lubricating a fitted portion where a shaft member and a tubular member are spline-fitted. The shaft member is rotatable about a rotation axis. The shaft member has outer spline teeth on an outer circumference at a tip. The tubular member has inner spline teeth fitted to the outer spline teeth on an inner circumference. The lubricating apparatus includes a lubricating oil supplying member. The lubricating oil supplying member is disposed to face a tip surface of the shaft member. An inner-shaft oil passage is formed inside the shaft member, the inner-shaft oil passage allowing an outer circumferential surface having the outer spline teeth and the tip surface to communicate with each other. A supplied oil passage is formed inside the lubricating oil supplying member, a lubricating oil supplied to the inner-shaft oil passage flowing through the supplied oil passage. The supplied oil passage is provided with an inflow port, the lubricating oil flowing into the supplied oil passage through the inflow port. The inflow port is open to an outer circumferential surface of the lubricating oil supplying member in a radial direction of the shaft member.

According to the lubricating apparatus of the present invention, the lubricating oil can be introduced into the lubricating oil supplying member through the inflow port, and thus, the lubricating oil can be supplied to the inner-shaft oil passage through the lubricating oil supplying member. Therefore, a sufficient amount of lubricating oil can be supplied from the inner-shaft oil passage to the fitted portion.

In the above-described lubricating apparatus, the lubricating oil supplying member is fixed with respect to the rotation axis of the shaft member. With such a configuration, it is unnecessary to take the action of centrifugal force on the lubricating oil into consideration. Therefore, even when the source pressure of the lubricating oil is relatively low, the lubricating oil can be more reliably supplied to the inner-shaft oil passage.

The above-described lubricating apparatus further includes an outer member. An upstream oil passage is formed inside the outer member, the lubricating oil supplied to the supplied oil passage flowing through the upstream oil passage. The upstream oil passage is provided on an outer side in the radial direction of the shaft member with respect to the fitted portion. With such a configuration, the oil passage leading to the inflow port of the supplied oil passage can be formed in a more space-saving manner.

In the above-described lubricating apparatus, the outer member is fixed with respect to the rotation axis of the shaft member. With such a configuration, it is unnecessary to take the action of centrifugal force on the lubricating oil into consideration. Therefore, even when the source pressure of the lubricating oil is relatively low, the lubricating oil can be more reliably supplied to the inner-shaft oil passage.

In the above-described lubricating apparatus, a planetary gear mechanism includes a sun gear, a plurality of planetary gears disposed around the sun gear, and a carrier supporting the planetary gears. The sun gear of the planetary gear mechanism forms the tubular member. An upstream oil passage is formed inside the carrier, and the lubricating oil supplied to the supplied oil passage flows through the upstream oil passage. With such a configuration, the oil passage leading to the inflow port of the supplied oil passage can be formed in a more space-saving manner.

In the above-described lubricating apparatus, the carrier is disposed such that a central axis thereof is coaxial with the rotation axis of the shaft member, and is fixed in a rotation direction. With such a configuration, it is unnecessary to take the action of centrifugal force on the lubricating oil into consideration. Therefore, even when the source pressure of the lubricating oil is relatively low, the lubricating oil can be more reliably supplied to the inner-shaft oil passage.

The above-described lubricating apparatus further includes a protruding portion protruding inward in the radial direction of the shaft member from an inner circumferential surface of the inner-shaft oil passage. With such a configuration, a flow of the lubricating oil leaking from the inner-shaft oil passage can be suppressed and the lubricating oil can be reliably supplied to the fitted portion. Therefore, the fitted portion can be efficiently lubricated.

In the above-described lubricating apparatus, a length of protrusion of the lubricating oil supplying member from the tip surface of the shaft member into the inner-shaft oil passage is longer than a distance from the tip surface of the shaft member to the protruding portion. With such a configuration, the lubricating oil can be reliably supplied to an oil pool formed inside the inner-shaft oil passage due to provision of the protruding portion, and thus, the fitted portion can be efficiently lubricated.

Advantageous Effects of Invention

According to the lubricating apparatus of the present invention, a sufficient amount of lubricating oil can be supplied to the spline-fitted portion.

DESCRIPTION OF EMBODIMENTS

An embodiment will be described hereinafter with reference to the drawings. It is originally intended to combine features in the embodiment as appropriate. Some components may not be employed.

Figures 1, 2:
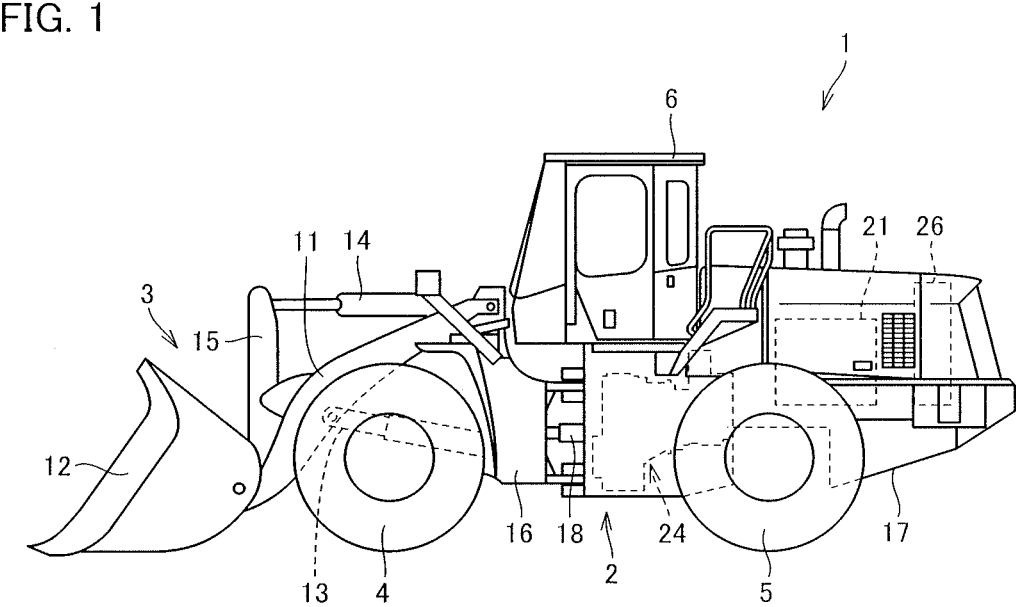
FIG. 1 is a diagram of an appearance of a work vehicle including a lubricating apparatus according to one embodiment of the present invention.
FIG. 2 is a schematic view illustrating a schematic configuration of a motive power transmission apparatus between a motor and a transmission.

FIG. 1 is a diagram of an appearance of a work vehicle 1 including a lubricating apparatus according to one embodiment of the present invention. Work vehicle 1 is, for example, a wheel loader. As illustrated in FIG. 1, work vehicle 1 includes a vehicular body frame 2, a work implement 3, driving wheels 4 and 5, and an operator's compartment 6. Work vehicle 1 runs by rotationally driving wheels 4 and 5. Work vehicle 1 uses work implement 3 to perform such work as excavation.

Vehicular body frame 2 has a front frame 16 and a rear frame 17. Front frame 16 and rear frame 17 are coupled to each other so as to be swingable in a right-and-left direction.

Work vehicle 1 includes a steering cylinder 18. One end of steering cylinder 18 is attached to front frame 16. The other end of steering cylinder 18 is attached to rear frame 17. Steering cylinder 18 is a hydraulic cylinder. Steering cylinder 18 expands and contracts, which causes front frame 16 to swing right and left with respect to rear frame 17. As a result, the movement direction of work vehicle 1 is changed to be right and left.

Work implement 3 and driving wheel 4 are attached to front frame 16. Work implement 3 has a boom 11 and a bucket 12. Boom 11 is attached to front frame 16 so as to be swingable in an up-and-down direction. Bucket 12 is attached to a tip of boom 11 so as to be swingable in the up-and-down direction.

Work implement 3 has a lift cylinder 13 and a bucket cylinder 14. Lift cylinder 13 and bucket cylinder 14 are hydraulic cylinders. One end of lift cylinder 13 is attached to front frame 16. The other end of lift cylinder 13 is attached to boom 11. Lift cylinder 13 expands and contracts, which causes boom 11 to swing up and down.

One end of bucket cylinder 14 is attached to front frame 16. The other end of bucket cylinder 14 is attached to a bell crank 15. Front frame 16 and bucket 12 are coupled with bucket cylinder 14, bell crank 15 and a not-illustrated link apparatus interposed therebetween. Bucket cylinder 14 expands and contracts, which causes bucket 12 to swing up and down.

Operator's compartment 6 and driving wheel 5 are attached to rear frame 17. A seat on which an operator is seated, an operation apparatus operated by the operator, and the like are provided inside operator's compartment 6.

Apparatuses such as an engine 21, a transmission 24 and a cooling apparatus 26 are mounted on rear frame 17. Engine 21 generates driving force for work vehicle 1 to run and perform the work. Engine 21 is, for example, a diesel engine. Transmission 24 changes the speed of the driving force from engine 21 and transmits the driving force to driving wheels 4 and 5. Cooling apparatus 26 has a radiator and the like for cooling a cooling liquid of engine 21.

A motor M/G not illustrated in FIG. 1 is mounted on transmission 24. Motor M/G functions as an electric motor that generates driving force using electrical energy. Motor M/G also functions as a generator that generates electrical energy using the input driving force.

FIG. 2 is a schematic view illustrating a schematic configuration of a motive power transmission apparatus between motor M/G and transmission 24. As illustrated in FIG. 2, a planetary gear mechanism 30 is provided between motor M/G and transmission 24. Motor M/G and planetary gear mechanism 30 are coupled by an input shaft 40. Planetary gear mechanism 30 and transmission 24 are coupled by an output shaft 110.

Motor M/G and transmission 24 can transmit the motive power via input shaft 40, planetary gear mechanism 30 and output shaft 110. Planetary gear mechanism 30 has a function as a speed reducer for changing a rotation speed ratio of output shall 110 to input shaft 40.

Planetary gear mechanism 30 has a sun gear 31, a plurality of planetary gears 32, a ring gear 33, and a carrier 34. Sun gear 31 engages with input shaft 40 so as to be rotatable integrally with input shaft 40. The plurality of planetary gears 32 are disposed around sun gear 31. Planetary gears 32 mesh with sun gear 31 and are rotatably supported by carrier 34. Carrier 34 is fixed to an oil passage housing 102 that will be described in detail below, and is provided so as not to be rotatable. Ring gear 33 meshes with planetary gears 32 and is rotatable. The rotation of ring gear 33 is output to output shaft 110 via a rotation transmission member 50 that will be described below.

Figure 3:
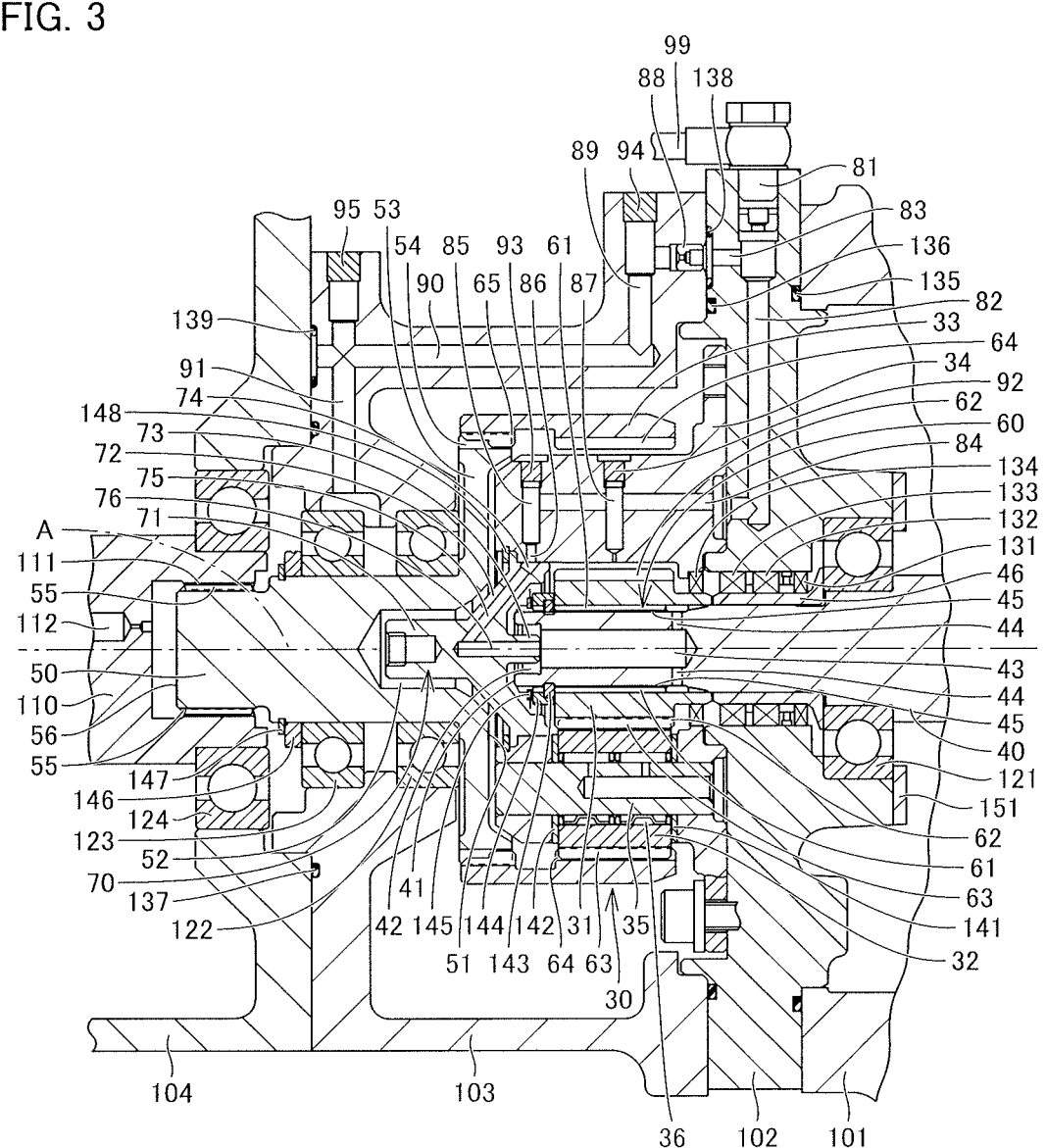
FIG. 3 is a cross-sectional view illustrating a configuration of the lubricating apparatus based on the embodiment.
Figure 4:
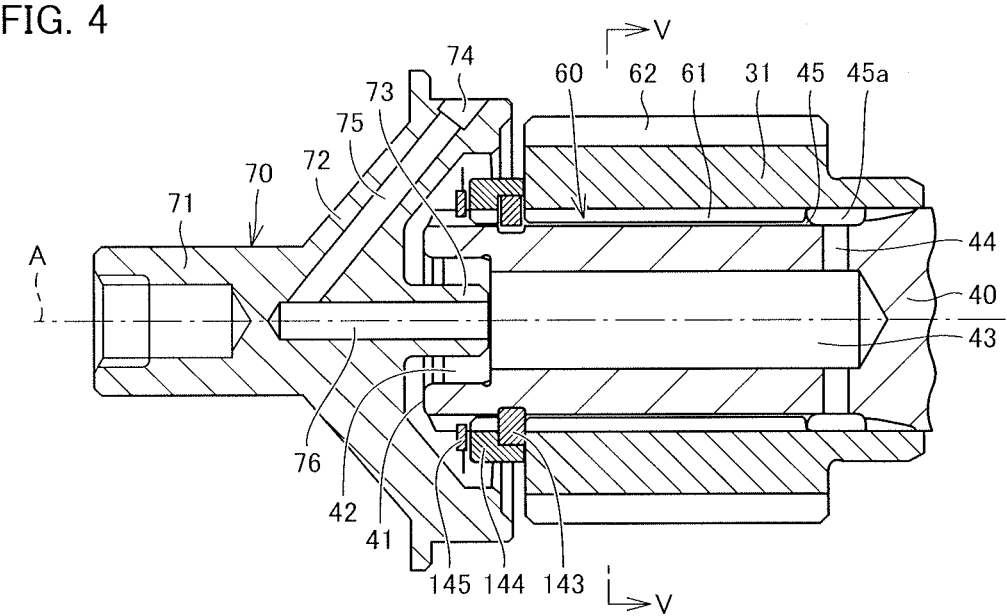
FIG. 4 is a partial enlarged view of the cross-sectional view illustrated in FIG. 3.
Figure 5:
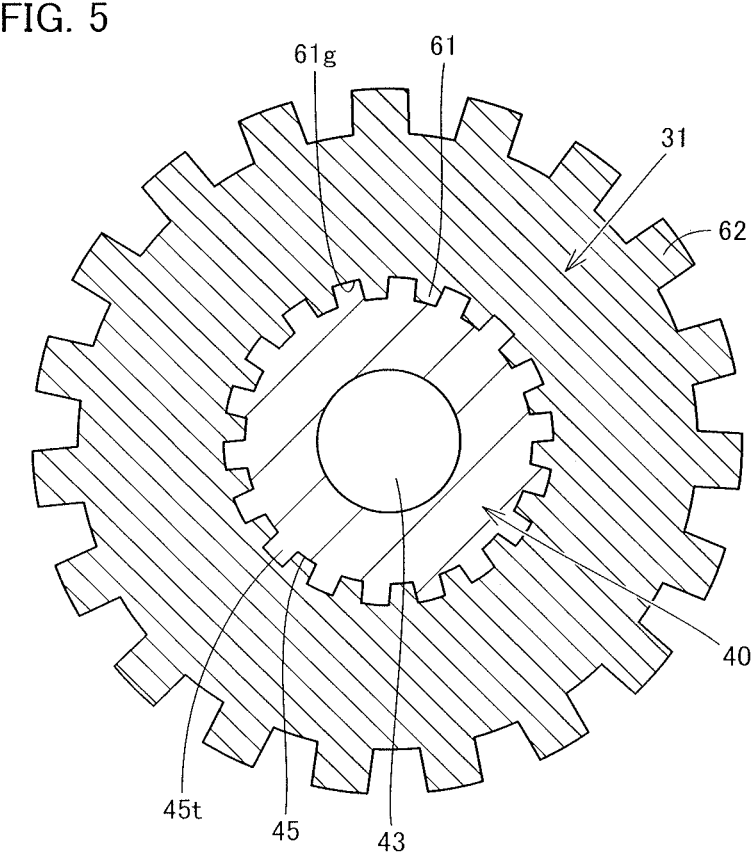
FIG. 5 is a cross-sectional view taken along line V-V in FIG. 4.

FIG. 3 is a cross-sectional view illustrating a configuration of the lubricating apparatus based on the embodiment. FIG. 4 is a partial enlarged view of the cross-sectional view illustrated in FIG. 3. FIG. 5 is a cross-sectional view taken along line V-V in FIG. 4.

As illustrated in FIG. 3, a gear housing 103 is formed to be hollow and houses planetary gear mechanism 30 therein. A motor housing 101 is formed to be hollow and houses the components of motor M/G illustrated in FIGS. 1 and 2 therein. A transmission housing 104 is formed to be hollow and houses the components of transmission 24 illustrated in FIGS. 1 and 2 therein.

Oil passage housing 102 is disposed between motor housing 101 and gear housing 103. Oil passage housing 102 is disposed to separate the internal space of motor housing 101 from the internal space of gear housing 103. Using a fixing member 151, an outer race of a bearing 121 is fixed to an inner circumferential surface of oil passage housing 102. An inner race of bearing 121 is fixed to an outer circumferential surface of input shaft 40. Bearing 121 supports input shaft 40 such that input shaft 40 is rotatable with respect to oil passage housing 102.

An O-ring 135 is disposed on an abutment surface between motor housing 101 and oil passage housing 102. O-rings 136 and 138 are disposed on an abutment surface between oil passage housing 102 and gear housing 103. O-rings 137 and 139 are disposed on an abutment surface between gear housing 103 and transmission housing 104. O-rings 135, 136, 137, 138, and 139 prevent leakage of a lubricating oil to the outside of the apparatus.

Input shaft 40 is rotatable about a rotation axis A. Input shaft 40 has a tip surface 41. Input shaft 40 is disposed to pass through oil passage housing 102. One tip of input shaft 40 including tip surface 41 protrudes into the internal space of gear housing 103. A central portion of tip surface 41 of input shaft 40 is recessed to form a recessed portion 42.

As illustrated in FIGS. 4 and 5, a plurality of outer spline teeth 45*t* are formed on an outer circumference of input shaft 40 on the tip surface 41 side. Outer spline teeth 45*t* extend from tip surface 41 in an axial direction of input shaft 40. The plurality of outer spline teeth 45*t* are formed to be arranged at regular intervals in a circumferential direction of input shaft 40. As illustrated in FIG. 5, a spline groove 45 is formed between two outer spline teeth 45*t* that are adjacent in the circumferential direction of input shaft 40. A plurality of spline grooves 45 are formed on the outer circumference of input shaft 40 on the tip surface 41 side. Spline grooves 45 extend from tip surface 41 of input shaft 40 in the axial direction of input shaft 40.

An axial oil passage 43 and a radial oil passage 44 are formed inside input shaft 40. Axial oil passage 43 extends, in the axial direction of input shaft 40, from a bottom surface of recessed portion 42 formed in tip surface 41 of input shaft 40. Axial oil passage 43 is formed in a central portion of input shaft 40. Axial oil passage 43 extends along rotation axis A that forms a center of rotation of input shaft 40. Axial oil passage 43 extends partway in the axial direction of input shaft 40, and has a shape with a bottom.

In the present embodiment, a bottom portion of axial oil passage 43 is located at a position more distant from tip surface 41 of input shaft 40 than an end of outer spline teeth 45*t* on a side away from tip surface 41. A length of axial oil passage 43 from tip surface 41 in the axial direction of input shaft 40 is longer than a length of outer spline teeth 45*t* in the axial direction of input shaft 40.

Radial oil passage 44 extends in a radial direction of input shaft 40. Radial oil passage 44 extends in the radial direction of input shaft 40 from the neighborhood of the bottom portion of axial oil passage 43 toward the outer circumferential surface of input shaft 40. As illustrated in FIG. 4, an outer circumferential groove 45*a* is formed at a position more distant from tip surface 41 of input shaft 40 than outer spline teeth 45*t*. Radial oil passage 44 is open to outer circumferential groove 45*a*.

Recessed portion 42, axial oil passage 43 and radial oil passage 44 allow tip surface 41 of input shaft 40 and outer circumferential groove 45*a* to communicate with each other. Input shaft 40 functions as a shaft member in the present embodiment. Recessed portion 42, axial oil passage 43 and radial oil passage 44 formed inside input shaft 40 function as an inner-shaft oil passage that allows outer circumferential groove 45*a* and tip surface 41 of input shaft 40 to communicate with each other.

As illustrated in FIGS. 4 and 5, a plurality of inner spline teeth 61 are formed on an inner circumference of sun gear 31. Inner spline teeth 61 extend in an axial direction of sun gear 31. The plurality of inner spline teeth 61 are disposed to be arranged at regular intervals in a circumferential direction of sun gear 31. As illustrated in FIG. 5, a spline groove 61*g* is formed between two inner spline teeth 61 that are adjacent in the circumferential direction of sun gear 31. Spline groove 61*g* extends in the axial direction of sun gear 31.

As illustrated in FIG. 5, inner spline teeth 61 provided on the inner circumference of sun gear 31 are fitted to outer spline teeth 45*t* provided on the outer circumference of input shaft 40. Inner spline teeth 61 also mesh with outer spline teeth 45*t*. Sun gear 31 and input shaft 40 are spline-fitted. Sun gear 31 engages with the outer circumferential surface of input shaft 40 so as to be rotatable about rotation axis A integrally with input shaft 40.

Sun gear 31 moves relative to input shaft 40 along the axial direction of input shaft 40 from the tip surface 41 side of input shaft 40, thereby being assembled to input shaft 40. Sun gear 31 and input shaft 40 are spline-fitted. Sun gear 31 functions as a tubular member in the present embodiment. Inner spline teeth 61 on the inner circumference of sun gear 31 and outer spline teeth 45*t* on the outer circumference of input shaft 40 are fitted to form a fitted portion 60 illustrated in FIGS. 3 and 4.

A bisected collar 143 is disposed on the outer circumference of input shaft 40 on the tip surface 41 side with respect to sun gear 31. A holding member 144 spline-fitted to input shaft 40 is disposed on the outer circumference of input shaft 40 on the tip surface 41 side with respect to bisected collar 143. An annular snap ring 145 is disposed on the outer circumference of input shaft 40 on the tip surface 41 side with respect to holding member 144. Bisected collar 143, holding member 144 and snap ring 145 determine a position of sun gear 31 in the axial direction of input shaft 40.

A plurality of gear teeth 62 are formed on the outer circumference of sun gear 31. The plurality of gear teeth 62 are disposed to be arranged at regular intervals in the circumferential direction of sun gear 31.

A tubular sleeve member 46 is disposed between sun gear 31 and bearing 121 in the axial direction of input shaft 40. One end of sleeve member 46 in the axial direction of input shaft 40 abuts on sun gear 31. The other end of sleeve member 46 in the axial direction of input shaft 40 abuts on the inner race of bearing 121. Seals 131, 132 and 133 are disposed between an outer circumferential surface of sleeve member 46 and the inner circumferential surface of oil passage housing 102. A seal 134 is disposed between a portion of an outer circumferential surface of sun gear 31 where gear teeth 62 are not formed and an inner circumferential surface of carrier 34 described below.

The plurality of planetary gears 32 are disposed around sun gear 31. A shaft 35 is disposed to pass through planetary gear 32. A bearing 36 is disposed between planetary gear 32 and shaft 35, and planetary gear 32 is supported so as to be rotatable on its own axis. Shaft 35 is fixed to carrier 34. Carrier 34 is fixed to oil passage housing 102. Carrier 34 surrounds the outer circumference of sun gear 31. Planetary gears 32 and carrier 34 are disposed to be more distant from rotation axis A of input shaft 40 than sun gear 31.

A thrust washer 141 is provided at a position between planetary gears 32 and carrier 34 on a side away from tip surface 41 in the axial direction of input shaft 40. A thrust washer 142 is provided at a position between planetary gears 32 and carrier 34 on a side close to tip surface 41 in the axial direction of input shaft 40. Thrust washers 141 and 142 are under thrust load between planetary gears 32 and carrier 34.

As described above, oil passage housing 102 rotatably supports input shaft 40 via bearing 121. Carrier 34 is fixed to oil passage housing 102 and does not rotate together with input shaft 40. Carrier 34 fixed to oil passage housing 102 is fixed with respect to rotation axis A of input shaft 40. Carrier 34 is provided as a non-rotating portion that does not rotate.

Gear teeth 63 are formed on an outer circumference of planetary gear 32. The plurality of gear teeth 63 are disposed to be arranged at regular intervals in a circumferential direction of planetary gear 32. Gear teeth 63 of planetary gear 32 mesh with gear teeth 62 of sun gear 31.

As illustrated in FIG. 3, ring gear 33 is disposed around planetary gears 32 and carrier 34. Ring gear 33 has a substantially cylindrical shape. Ring gear 33 is rotatable about rotation axis A.

Gear teeth 64 are formed on an inner circumference of ring gear 33. Gear teeth 64 of ring gear 33 mesh with gear teeth 63 of planetary gear 32. Inner spline teeth 65 are also formed on the inner circumference of ring gear 33. Inner spline teeth 65 of ring gear 33 mesh with outer spline teeth 54 of rotation transmission member 50 described below.

The rotation of ring gear 33 is transmitted to rotation transmission member 50. As illustrated in FIG. 3, rotation transmission member 50 is disposed to be concentric with input shaft 40. Rotation transmission member 50 is rotatable about rotation axis A. Rotation transmission member 50 has one end 51 on a side facing toward tip surface 41 of input shaft 40, and the other end 56 opposite to one end 51. An outer race of each of bearings 122 and 123 is fixed to an inner circumferential surface of gear housing 103. An inner race of each of bearings 122 and 123 is fixed to an outer circumferential surface of rotation transmission member 50. Bearings 122 and 123 support rotation transmission member 50 such that rotation transmission member 50 is rotatable with respect to gear housing 103. The inner race of bearing 123 is positioned in an axial direction of rotation transmission member 50 by a holding member 146 and a snap ring 147.

A part of one end 51 of rotation transmission member 50 is recessed to form a recessed portion 52. Rotation transmission member 50 has a flange portion 53 having a shape protruding radially outward at one end 51. Flange portion 53 has a substantially disc-like shape. Outer spline teeth 54 are formed on an outer circumferential edge of flange portion 53. As described above, outer spline teeth 54 mesh with inner spline teeth 65 of ring gear 33.

A plurality of outer spline teeth 55 extending from the other end 56 in the axial direction of rotation transmission member 50 are formed on the outer circumferential surface of rotation transmission member 50. The plurality of outer spline teeth 55 are disposed to be arranged at regular intervals in a circumferential direction of rotation transmission member 50.

Transmission 24 illustrated in FIGS. 1 and 2 has output shaft 110. Output shaft 110 is housed within transmission housing 104. Output shaft 110 is disposed to be concentric with rotation transmission member 50. Output shaft 110 is rotatable about rotation axis A. An outer race of a bearing 124 is fixed to an inner circumferential surface of transmission housing 104. An inner race of bearing 124 is fixed to an outer circumferential surface of output shaft 110. Bearing 124 supports output shaft 110 such that output shaft 110 is rotatable with respect to transmission housing 104.

A plurality of inner spline teeth 111 extending in an axial direction of output shaft 110 are formed on an inner circumferential surface of output shaft 110. The plurality of inner spline teeth 111 are disposed to be arranged at regular intervals in a circumferential direction of output shaft 110. Inner spline teeth 111 of output shaft 110 are fitted to outer spline teeth 55 of rotation transmission member 50. Inner spline teeth 111 of output shaft 110 also mesh with outer spline teeth 55 of rotation transmission member 50. Rotation transmission member 50 and output shaft 110 are spline-fitted. Rotation transmission member 50 and output shaft 110 engage with each other so as to be integrally rotatable about rotation axis A.

Ring gear 33 of planetary gear mechanism 30 and output shaft 110 are coupled with rotation transmission member 50 interposed therebetween. Since outer spline teeth 54 of rotation transmission member 50 mesh with inner spline teeth 65 of ring gear 33 and rotation transmission member 50 is spline-fitted to output shaft 110, ring gear 33 and output shaft 110 rotate integrally. The rotation of ring gear 33 is transmitted to output shaft 110 through rotation transmission member 50.

A lubricating oil supplying member 70 is disposed between input shaft 40 and rotation transmission member 50 in the axial direction of input shaft 40 and rotation transmission member 50. Lubricating oil supplying member 70 is disposed to face tip surface 41 of input shaft 40. Lubricating oil supplying member 70 is spaced apart from input shaft 40. Lubricating oil supplying member 70 is provided to be in non-contact with input shaft 40. Lubricating oil supplying member 70 is disposed to face one end 51 of rotation transmission member 50. Lubricating oil supplying member 70 is spaced apart from rotation transmission member 50. Lubricating oil supplying member 70 is provided to be in non-contact with rotation transmission member 50.

In the present embodiment, lubricating oil supplying member 70 has an axisymmetric outer shape in which rotation axis A is an axis of symmetry. Lubricating oil supplying member 70 has a protruding portion 71, a coupling portion 72 and a protruding portion 73. Protruding portion 71 protrudes toward input shaft 40 with respect to coupling portion 72. Protruding portion 73 protrudes toward rotation transmission member 50 with respect to coupling portion 72. Protruding portion 71 is housed within recessed portion 52 formed in rotation transmission member 50. Protruding portion 73 is housed within recessed portion 42 formed in input shaft 40.

Coupling portion 72 couples protruding portion 71 to protruding portion 73 in the axial direction of input shaft 40. Coupling portion 72 is provided between protruding portion 71 and protruding portion 73. Coupling portion 72 has an umbrella-like shape. An outer circumferential edge of coupling portion 72 forms a portion of lubricating oil supplying member 70 having a largest diameter. The outer circumferential edge of coupling portion 72 engages with carrier 34. Using a snap ring 148, lubricating oil supplying member 70 is fixed to carrier 34. As described above, carrier 34 is fixed to oil passage housing 102, and thus, lubricating oil supplying member 70 is provided as a non-rotating portion that does not rotate. Lubricating oil supplying member 70 is fixed with respect to rotation axis A.

A first supplied oil passage 75 and a second supplied oil passage 76 are formed inside lubricating oil supplying member 70. First supplied oil passage 75 is formed inside coupling portion 72. First supplied oil passage 75 is open to an outer circumferential surface of coupling portion 72. The opening of first supplied oil passage 75 forms an inflow port 74 through which a lubricating oil flows into first supplied oil passage 75.

Second supplied oil passage 76 extends along rotation axis A. A substantially cylindrical space centered at rotation axis A forms second supplied oil passage 76. Second supplied oil passage 76 is formed to extend over coupling portion 72 and protruding portion 73. Second supplied oil passage 76 is open to an end face of protruding portion 73. Second supplied oil passage 76 is open toward axial oil passage 43 formed in input shaft 40.

First supplied oil passage 75 and second supplied oil passage 76 communicate with each other. First supplied oil passage 75 and second supplied oil passage 76 form a supplied oil passage in the present embodiment. The supplied oil passage is formed inside lubricating oil supplying member 70. The lubricating oil supplied to the inner-shaft oil passage formed inside input shaft 40 flows through the supplied oil passage. Inflow port 74 through which the lubricating oil flows into the supplied oil passage is open to an outer circumferential surface of lubricating oil supplying member 70 in the radial direction of input shaft 40. The lubricating oil flowing into first supplied oil passage 75 through inflow port 74 flows through first supplied oil passage 75 and second supplied oil passage 76 in this order, and flows out from second supplied oil passage 76 toward axial oil passage 43 formed in input shaft 40.

The supplied oil passage formed inside lubricating oil supplying member 70 has inflow port 74 through which the lubricating oil flows into the supplied oil passage, and an outflow port through which the lubricating oil flows out from the supplied oil passage. As illustrated in FIGS. 3 and 4, in the present embodiment, inflow port 74 of the supplied oil passage is provided on a further outer side in the radial direction of input shaft 40 than the outflow port of the supplied oil passage.

A first upstream oil passage 84 and a second upstream oil passage 85 are formed inside carrier 34. First upstream oil passage 84 extends in the axial direction of input shaft 40. First upstream oil passage 84 extends toward the inside of carrier 34 from a portion of a surface of carrier 34 facing toward oil passage housing 102.

Second upstream oil passage 85 communicates with an end of first upstream oil passage 84. Second upstream oil passage 85 extends in the radial direction of input shaft 40. Second upstream oil passage 85 extends from an outer circumferential surface to an inner circumferential surface of carrier 34. Second upstream oil passage 85 connects to the inner circumferential surface of carrier 34. An outflow port 86 through which the lubricating oil flows out from second upstream oil passage 85 is formed at an end of second upstream oil passage 85 on the inner circumferential side of carrier 34. Outflow port 86 communicates with inflow port 74 formed in lubricating oil supplying member 70.

A closing member 93 is disposed at an end of second upstream oil passage 85 on the outer circumferential side of carrier 34. Closing member 93 closes the end of second upstream oil passage 85 on the outer circumferential side of carrier 34. Closing member 93 is provided to ensure that the lubricating oil flowing into second upstream oil passage 85 through first upstream oil passage 84 flows toward outflow port 86.

Carrier 34 is disposed on a further outer side in the radial direction of input shaft 40 than sun gear 31. Therefore, first upstream oil passage 84 is provided on an outer side in the radial direction of input shaft 40 with respect to fitted portion 60 where input shaft 40 and sun gear 31 are spline-fitted. Outflow port 86 of second upstream oil passage 85 is open to the inner circumferential surface of carrier 34, and faces inflow port 74 open to the outer circumferential surface of lubricating oil supplying member 70.

A branch oil passage 87 is also formed inside carrier 34. First upstream oil passage 84 extends in the axial direction of input shaft 40, and branch oil passage 87 communicates with first upstream oil passage 84 in a central portion in a direction of extension of first upstream oil passage 84. Branch oil passage 87 extends in the radial direction of input shaft 40. Branch oil passage 87 extends from the outer circumferential surface to the inner circumferential surface of carrier 34. Branch oil passage 87 is open to the inner circumferential surface of carrier 34. Branch oil passage 87 is open toward gear teeth 62 formed on the outer circumference of sun gear 31.

A closing member 92 is disposed at an end of branch oil passage 87 on the outer circumferential side of carrier 34. Closing member 92 closes the end of branch oil passage 87 on the outer circumferential side of carrier 34. Closing member 92 is provided to ensure that the lubricating oil flowing into branch oil passage 87 through first upstream oil passage 84 flows toward the opening on the inner circumferential side of carrier 34.

The lubricating oil flowing into first upstream oil passage 84 flows through first upstream oil passage 84 and second upstream oil passage 85 in this order, and flows out from outflow port 86 toward inflow port 74 formed in lubricating oil supplying member 70. The lubricating oil flowing out from second upstream oil passage 85 is supplied to the supplied oil passage formed in lubricating oil supplying member 70. First upstream oil passage 84 and second upstream oil passage 85 form an upstream oil passage in the present embodiment, through which the lubricating oil supplied to the supplied oil passage flows. Carrier 34 functions as an outer member in the present embodiment.

A part of the lubricating oil flowing through first upstream oil passage 84 flows into branch oil passage 87. The lubricating oil flows through branch oil passage 87 and flows out from the opening on the inner circumferential side of carrier 34, to lubricate a portion where gear teeth 62 and gear teeth 63 mesh with each other. In consideration of a pressure loss in the oil passages, the opening of branch oil passage 87 is formed to have a small diameter such that the lubricating oil is reliably supplied to lubricating oil supplying member 70 through second upstream oil passage 85. The diameter of branch oil passage 87 is reduced at an end on the inner circumferential side of carrier 34.

An introduction oil passage 82 is formed inside oil passage housing 102. Introduction oil passage 82 has an oil introduction port 81 at a radially outside end thereof. An oil feeding pipe 99 is coupled to an outer circumferential surface of oil passage housing 102. Oil feeding pipe 99 communicates with oil introduction port 81. Introduction oil passage 82 extends to a portion of a surface of oil passage housing 102 facing toward carrier 34. Introduction oil passage 82 communicates with first upstream oil passage 84 formed inside carrier 34.

Oil feeding pipe 99 is coupled to a not-illustrated oil pump. The lubricating oil discharged from the oil pump flows through oil feeding pipe 99 and is introduced from oil introduction port 81 into introduction oil passage 82. Furthermore, the lubricating oil flows out from introduction oil passage 82 toward the upstream oil passage formed inside carrier 34.

The lubricating oil flows through introduction oil passage 82 formed in oil passage housing 102, the upstream oil passage formed in carrier 34, the supplied oil passage formed in lubricating oil supplying member 70, and the inner-shaft oil passage formed in input shaft 40 in this order, and is supplied to fitted portion 60 where input shaft 40 and sun gear 31 are spline-fitted. The path of the lubricating oil flowing from oil passage housing 102 through carrier 34 to lubricating oil supplying member 70 is formed such that the lubricating oil flows inward in the radial direction of input shaft 40. The path of the lubricating oil flowing from lubricating oil supplying member 70 through input shaft 40 to fitted portion 60 is formed such that the lubricating oil flows outward in the radial direction of input shaft 40.

An annular groove is formed in an abutment surface of the surface of carrier 34 that abuts on oil passage housing 102. This groove is formed to have an annular shape centered at rotation axis A, and is formed over the entire circumference centered at rotation axis A. Through this groove, the lubricating oil is supplied from the introduction oil passage to first upstream oil passage 84. This groove also communicates with a lubricating hole formed inside shaft 35. A part of the lubricating oil is supplied to bearing 36 through the lubricating hole formed inside shaft 35, to lubricate bearing 36.

A branched oil passage 83 branching off from introduction oil passage 82 is also formed inside oil passage housing 102. Branched oil passage 83 extends to a portion of the surface of oil passage housing 102 facing toward gear housing 103. An O-ring 138 is disposed around an opening of branched oil passage 83 open to the surface of oil passage housing 102.

A first bearing oil passage 88, a second bearing oil passage 89, a third bearing oil passage 90, and a fourth bearing oil passage 91 are formed inside gear housing 103. First bearing oil passage 88 communicates with branched oil passage 83 formed inside oil passage housing 102. The lubricating oil introduced into gear housing 103 through branched oil passage 83 flows through first bearing oil passage 88, second bearing oil passage 89, third bearing oil passage 90, and fourth bearing oil passage 91 in this order and is supplied to bearing 122 and bearing 123, to lubricate bearing 122 and bearing 123.

A closing member 94 is disposed at a radially outside end of second bearing oil passage 89. Closing member 94 closes second bearing oil passage 89. A closing member 95 is disposed at a radially outside end of fourth bearing oil passage 91. Closing member 95 closes fourth bearing oil passage 91. Third bearing oil passage 90 extends to a portion of a surface of gear housing 103 facing toward transmission housing 104. An O-ring 139 is disposed around an opening of third bearing oil passage 90 open to the surface of gear housing 103.

An output side oil passage 112 is formed inside output shaft 110. The lubricating oil is supplied through output side oil passage 112 to a fitted portion where rotation transmission member 50 and output shaft 110 are spline-fitted.

Figure 6:
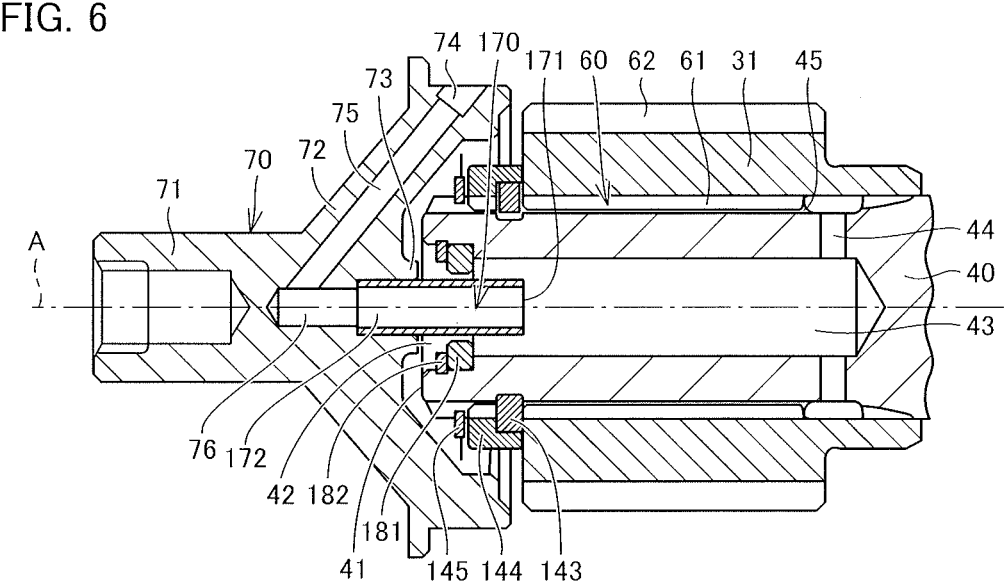
FIG. 6 is a cross-sectional view illustrating a configuration of a lubricating apparatus according to a first modification.

FIG. 6 is a cross-sectional view illustrating a configuration of a lubricating apparatus according to a first modification. The first modification illustrated in FIG. 6 is different from the example illustrated in FIGS. 3 and 4 in that lubricating oil supplying member 70 has a tubular member 170. Tubular member 170 is fixed to lubricating oil supplying member 70. Tubular member 170 has a hollow cylindrical shape. Tubular member 170 is disposed such that an axis of tubular member 170 matches with rotation axis A of input shaft 40. Tubular member 170 has a base end fixed to lubricating oil supplying member 70, and a tip opposite to the base end. A cylindrical hollow space 172 is formed inside tubular member 170. Formed at the tip of tubular member 170 is an outflow port 171 where hollow space 172 formed inside tubular member 170 is open to the tip.

Hollow space 172 formed inside tubular member 170 communicates with second supplied oil passage 76 formed inside lubricating oil supplying member 70. The lubricating oil flowing into first supplied oil passage 75 through inflow port 74 flows through second supplied oil passage 76 and hollow space 172 in this order and flows out from outflow port 171, and is supplied to axial oil passage 43. First supplied oil passage 75, second supplied oil passage 76 and hollow space 172 form a supplied oil passage in the first modification. Lubricating oil supplying member 70 and tubular member 170 together form a lubricating oil supplying member having the supplied oil passage formed therein in the first modification.

A protruding portion 181 is provided inside input shaft 40. Protruding portion 181 has an annular shape. Protruding portion 181 is fixed to input shaft 40 by a snap ring 182 and a step portion on an inner circumferential surface of an inner-shaft oil passage formed inside input shaft 40. As illustrated in FIG. 6, protruding portion 181 has a shape protruding inward in a radial direction of input shaft 40 from the inner circumferential surface of the inner-shaft oil passage.

Protruding portion 181 is disposed inside recessed portion 42. Outflow port 171 of tubular member 170 is disposed inside axial oil passage 43. Outflow port 171 of tubular member 170 is disposed on a further inner side in the inner-shaft oil passage than protruding portion 181. Tubular member 170 protrudes from tip surface 41 of input shaft 40 further into the inner-shaft oil passage than the position where protruding portion 181 is disposed. A length of protrusion of tubular member 170 from tip surface 41 of input shaft 40 into the inner-shaft oil passage is longer than a distance from tip surface 41 of input shaft 40 to protruding portion 181. The lubricating oil supplied from tubular member 170 to the inner-shaft oil passage flows into the inner-shaft oil passage at the position in the inner-shaft oil passage which is more distant from tip surface 41 of input shaft 40 than protruding portion 181. Protruding portion 181 blocks the lubricating oil supplied from tubular member 170 to the inner-shaft oil passage, and suppresses an amount of the lubricating oil leaking from tip surface 41 of input shaft 40 to the outside of the inner-shaft oil passage.

Figure 7:
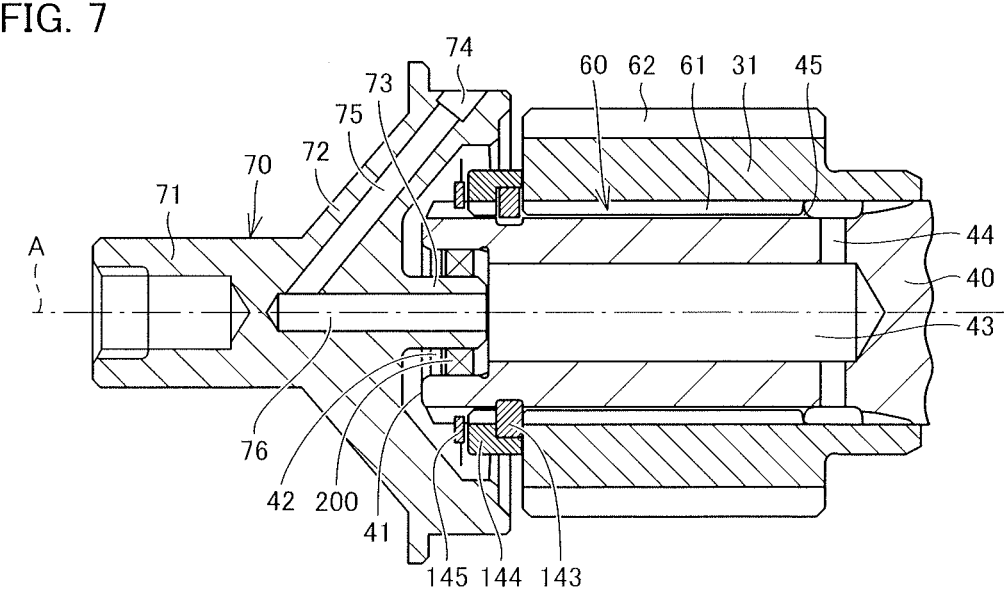
FIG. 7 is a cross-sectional view illustrating a configuration of a lubricating apparatus according to a second modification.

FIG. 7 is a cross-sectional view illustrating a configuration of a lubricating apparatus according to a second modification. The second modification illustrated in FIG. 7 is different from the example illustrated in FIGS. 3 and 4 in that an oil seal 200 is provided. Oil seal 200 is disposed between an outer circumferential surface of protruding portion 73 of lubricating oil supplying member 70 and an outer circumferential surface of recessed portion 42 formed inside input shaft 40.

Oil seal 200 suppresses a flow of the lubricating oil passing through a portion between the outer circumferential surface of protruding portion 73 and the outer circumferential surface of recessed portion 42. Oil seal 200 suppresses a phenomenon in which the lubricating oil supplied from lubricating oil supplying member 70 to axial oil passage 43 passes through the portion between the outer circumferential surface of protruding portion 73 and the outer circumferential surface of recessed portion 42 and leaks from tip surface 41 to the outside of input shaft 40. Since oil seal 200 is provided, the lubricating oil flowing into axial oil passage 43 is reliably supplied to fitted portion 60 through radial oil passage 44. As a result, efficient lubrication of fitted portion 60 is possible.

Figure 8:
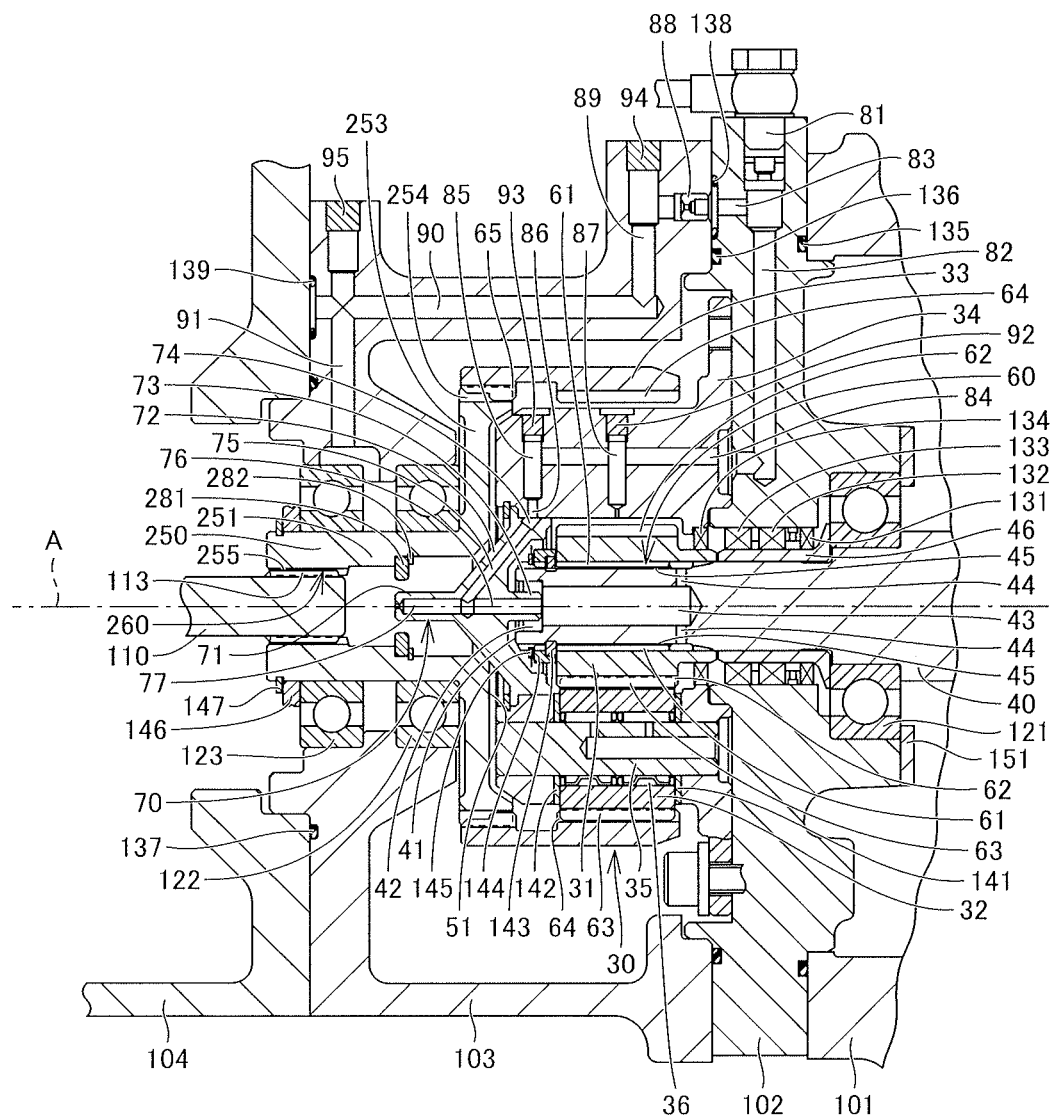
FIG. 8 is a cross-sectional view illustrating a configuration of a lubricating apparatus according to a third modification.

FIG. 8 is a cross-sectional view illustrating a configuration of a lubricating apparatus according to a third modification. The third modification illustrated in FIG. 8 is different from the example illustrated in FIG. 3 in terms of a configuration of a rotation transmission member that transmits the rotation from ring gear 33 to output shaft 110, and a configuration for lubricating a spline-fitted portion where the rotation transmission member and output shaft 110 are spline-fitted.

More specifically, instead of rotation transmission member 50 illustrated in FIG. 3, a rotation transmission member 250 is provided. Rotation transmission member 250 is disposed to be concentric with input shaft 40. Rotation transmission member 250 is rotatable about rotation axis A. Rotation transmission member 250 has a sleeve portion 251 having a substantially hollow cylindrical shape, and a flange portion 253 having a shape protruding radially outward with respect to sleeve portion 251. Sleeve portion 251 of rotation transmission member 250 is supported by bearings 122 and 123 so as to be rotatable with respect to gear housing 103.

Flange portion 253 has a substantially disc-like shape. Outer spline teeth 254 are formed on an outer circumferential edge of flange portion 253. Outer spline teeth 254 mesh with inner spline teeth 65 of ring gear 33.

A plurality of inner spline teeth 255 extending from an end of sleeve portion 251 in an axial direction of rotation transmission member 250 are formed on an inner circumferential surface of sleeve portion 251. The plurality of inner spline teeth 255 are disposed to be arranged at regular intervals in a circumferential direction of rotation transmission member 250.

Output shaft 110 is disposed to be concentric with rotation transmission member 250. A plurality of outer spline teeth 113 extending in an axial direction of output shaft 110 are formed on an outer circumferential surface of output shaft 110. The plurality of outer spline teeth 113 are disposed to be arranged at regular intervals in a circumferential direction of output shaft 110. Outer spline teeth 113 of output shaft 110 are fitted to inner spline teeth 255 of rotation transmission member 250 to form a fitted portion 260. Outer spline teeth 113 of output shaft 110 also mesh with inner spline teeth 255 of rotation transmission member 250. Rotation transmission member 250 and output shaft 110 are spline-fitted. Rotation transmission member 250 and output shaft 110 engage with each other so as to be integrally rotatable about rotation axis A.

Ring gear 33 of planetary gear mechanism 30 and output shaft 110 are coupled with rotation transmission member 250 interposed therebetween. Since outer spline teeth 254 of rotation transmission member 250 mesh with inner spline teeth 65 of ring gear 33 and rotation transmission member 250 is spline-fitted to output shaft 110, ring gear 33 and output shaft 110 rotate integrally. The rotation of ring gear 33 is transmitted to output shaft 110 through rotation transmission member 250.

In addition to first supplied oil passage 75 and second supplied oil passage 76, a third supplied oil passage 77 is formed inside lubricating oil supplying member 70. Third supplied oil passage 77 is formed inside protruding portion 71. Third supplied oil passage 77 has one end that communicates with first supplied oil passage 75, and the other end that is open to an end face of protruding portion 71. Third supplied oil passage 77 is open toward a hollow space formed inside sleeve portion 251 of rotation transmission member 250.

Lubricating oil supplying member 70 supplies the lubricating oil to both fitted portion 60 where input shaft 40 and sun gear 31 are spline-fitted and fitted portion 260 where rotation transmission member 250 and output shaft 110 are spline-fitted. Since one lubricating apparatus can supply the lubricating oil to the two spline-fitted portions, lubrication of the spline-fitted portions is possible with a simpler configuration.

A protruding portion 281 is provided in the hollow space formed inside sleeve portion 251. Protruding portion 281 has an annular shape. Protruding portion 281 is fixed to sleeve portion 251 by a snap ring 282 and a step portion on an inner circumferential surface of the hollow space formed inside sleeve portion 251. As illustrated in FIG. 8, protruding portion 281 has a shape protruding inward in a radial direction of sleeve portion 251 from the inner circumferential surface of the hollow space formed inside sleeve portion 251. Protruding portion 281 does not need to be a component separate from sleeve portion 251, and may be formed integrally with sleeve portion 251. When protruding portion 281 is formed integrally with sleeve portion 251, snap ring 282 is not required.

Protruding portion 71 of lubricating oil supplying member 70 protrudes further into the hollow space formed inside sleeve portion 251 than a position where protruding portion 281 is disposed. A length of protrusion of protruding portion 71 of lubricating oil supplying member 70 into the hollow space formed inside sleeve portion 251 is longer than a distance from an end face of sleeve portion 251 to protruding portion 281.

The lubricating oil flowing into first supplied oil passage 75 through inflow port 74 flows through first supplied oil passage 75 and third supplied oil passage 77 in this order, and flows out from third supplied oil passage 77 toward the hollow space formed inside sleeve portion 251 of rotation transmission member 250. The lubricating oil supplied from third supplied oil passage 77 to the hollow space formed inside sleeve portion 251 flows to the hollow space formed inside sleeve portion 251, at a position in the hollow space formed inside sleeve portion 251, which is more distant from the end face of sleeve portion 251 than protruding portion 281.

Due to the action of centrifugal force caused by the rotation of rotation transmission member 250, the force of being pressed against the inner circumferential surface of sleeve portion 251 is exerted on the lubricating oil flowing to the hollow space formed inside sleeve portion 251. Protruding portion 281 protruding from the inner circumferential surface of sleeve portion 251 suppresses leakage, from the hollow space, of the lubricating oil supplied from third supplied oil passage 77 to the hollow space formed inside sleeve portion 251. As a result, the lubricating oil supplied to the hollow space is reliably supplied to fitted portion 260 where rotation transmission member 250 and output shaft 110 are spline-fitted. Therefore, efficient lubrication of fitted portion 260 is possible.

Next, the function and effect of the present embodiment will be described.

The lubricating apparatus in the present embodiment is an apparatus for lubricating fitted portion 60 where input shaft 40 and sun gear 31 are spline-fitted. Input shaft 40 is rotatable about rotation axis A. As illustrated in FIGS. 3 to 5, input shaft 40 has outer spline teeth 45t on the outer circumference at the tip. As illustrated in FIGS. 3 to 5, sun gear 31 has inner spline teeth 61 fitted to outer spline teeth 45t on the inner circumference. As illustrated in FIGS. 3 and 4, the lubricating apparatus includes lubricating oil supplying member 70. Lubricating oil supplying member 70 is disposed to face tip surface 41 of input shaft 40.

As illustrated in FIGS. 3 and 4, recessed portion 42, axial oil passage 43 and radial oil passage 44 are formed inside input shaft 40. Recessed portion 42, axial oil passage 43 and radial oil passage 44 form the inner-shaft oil passage that allows the outer circumferential surface of input shaft 40 having outer spline teeth 45t and tip surface 41 to communicate with each other. First supplied oil passage 75 and second supplied oil passage 76 are formed inside lubricating oil supplying member 70. First supplied oil passage 75 and second supplied oil passage 76 form the supplied oil passage through which the lubricating oil supplied to the inner-shaft oil passage flows. First supplied oil passage 75 is provided with inflow port 74 through which the lubricating oil flows into first supplied oil passage 75. Inflow port 74 is open to the outer circumferential surface of lubricating oil supplying member 70 in the radial direction of input shaft 40.

In order to supply the lubricating oil to the inner-shaft oil passage formed inside input shaft 40, lubricating oil supplying member 70 is disposed at the position facing the tip surface of input shaft 40. Therefore, even when the oil passage extending across the opposing ends of input shaft 40 is not formed inside input shaft 40, the lubricating oil can be supplied to the inner-shaft oil passage. Through inflow port 74 that is open to the outer circumferential surface of lubricating oil supplying member 70, the lubricating oil is introduced into the supplied oil passage formed inside lubricating oil supplying member 70. The lubricating oil can be introduced from the outer side in the radial direction of input shaft 40 to the supplied oil passage formed inside lubricating oil supplying member 70, and thus, the lubricating oil can be introduced into the supplied oil passage of lubricating oil supplying member 70.

Even when the axially extending oil passage for supplying the lubricating oil to the spline-fitted portion cannot be formed due to the structural constraints, the lubricating oil can be introduced from the radially outer side to lubricating oil supplying member 70, and thus, the lubricating oil can be supplied to the inner-shaft oil passage through lubricating oil supplying member 70. Therefore, even when input shaft 40 rotates at high speed, a sufficient amount of the lubricating oil can be supplied from the radially inner side through the inner-shaft oil passage to fitted portion 60.

In addition, as illustrated in FIG. 3, lubricating oil supplying member 70 is fixed with respect to rotation axis A of input shaft 40. When lubricating oil supplying member 70 is a member that rotates about rotation axis A, the centrifugal force occurs due to the rotation of lubricating oil supplying member 70, and thus, it is necessary to increase the source pressure of the lubricating oil required to allow the lubricating oil introduced from the radially outer side to the supplied oil passage to arrive at the inner-shaft oil passage. However, when lubricating oil supplying member 70 is a non-rotating member fixed with respect to rotation axis A, it is unnecessary to take the action of centrifugal force on the lubricating oil into consideration. Therefore, even when the source pressure of the lubricating oil is relatively low, the lubricating oil can be more reliably supplied to the inner-shaft oil passage. In addition, the source pressure of the lubricating oil can be reduced, and thus, the consumption power cost of the oil pump can be reduced.

In addition, as illustrated in FIG. 3, first upstream oil passage 84 and second upstream oil passage 85 are formed inside carrier 34. The lubricating oil supplied to the supplied oil passage formed inside lubricating oil supplying member 70 flows through first upstream oil passage 84 and second upstream oil passage 85 in this order. First upstream oil passage 84 and second upstream oil passage 85 form the upstream oil passage through which the lubricating oil supplied to the supplied oil passage flows. First upstream oil passage 84 is provided on the outer side in the radial direction of input shaft 40 with respect to fitted portion 60 where input shaft 40 and sun gear 31 are spline-fitted.

The oil passage through which the lubricating oil supplied to the supplied oil passage flows is formed inside the member disposed radially outside with respect to fitted portion 60, and thus, the oil passage leading to the inflow port of the supplied oil passage can be formed in a more space-saving manner. In the case of supplying the lubricating oil to the fitted portion where sun gear 31 and input shaft 40 of planetary gear mechanism 30 are spline-fitted, the oil passage through which the lubricating oil supplied to the supplied oil passage flows is formed inside carrier 34 of planetary gear mechanism 30, and thus, the oil passage leading to the inflow port of the supplied oil passage can be formed in a more space-saving manner.

In addition, as illustrated in FIG. 3, the central axis of carrier 34 is coaxial with rotation axis A of input shaft 40. Carrier 34 is fixed with respect to rotation axis A of input shaft 40 in the rotation direction. When the member formed inside the upstream oil passage is a member that rotates about rotation axis A, the centrifugal force occurs due to the rotation of this member, and thus, it is necessary to increase the source pressure of the lubricating oil required to allow the lubricating oil to arrive at the supplied oil passage. However, when carrier 34 is a non-rotating member fixed with respect to rotation axis A, it is unnecessary to take the action of centrifugal force on the lubricating oil into consideration. Therefore, even when the source pressure of the lubricating oil is relatively low, the lubricating oil can be more reliably supplied to the inner-shaft oil passage and the power cost of the oil pump can be reduced.

In addition, as illustrated in FIG. 6, protruding portion 181 protrudes inward in the radial direction of input shaft 40 from the inner circumferential surface of axial oil passage 43 formed inside input shaft 40.

Due to the action of centrifugal force caused by the rotation of input shaft 40, the force of being pressed against the inner circumferential surface of axial oil passage 43 is exerted on the lubricating oil supplied from lubricating oil supplying member 70 to axial oil passage 43. Since protruding portion 181 protruding radially inward from the inner circumferential surface of axial oil passage 43 is provided, protruding portion 181 blocks the lubricating oil that gathers on the inner circumferential surface of axial oil passage 43, and thus, a flow of the lubricating oil from axial oil passage 43 to tip surface 41 is inhibited. As a result, a flow of the lubricating oil that leaks from the inner-shaft oil passage through tip surface 41 is suppressed.

The lubricating oil accumulated in the inner-shaft oil passage by protruding portion 181 flows from axial oil passage 43 into radial oil passage 44 extending radially outward with respect to axial oil passage 43, and is supplied to fitted portion 60. As a result, the lubricating oil is reliably supplied to fitted portion 60, and thus, fitted portion 60 can be efficiently lubricated.

Instead of the above-described example in which protruding portion 181 is provided as a member separate from input shaft 40 and is fixed to input shaft 40, input shaft 40 may be formed such that a part of the inner circumferential surface of axial oil passage 43 protrudes radially inward, and the protruding portion may be formed integrally with input shaft 40.

In addition, as illustrated in FIG. 6, lubricating oil supplying member 70 has tubular member 170. A length of protrusion of tubular member 170 from tip surface 41 of input shaft 40 into axial oil passage 43 is longer than a distance from tip surface 41 of input shaft 40 to protruding portion 181. With such a configuration, the lubricating oil can be reliably supplied to an oil pool formed inside axial oil passage 43 due to provision of protruding portion 181, and thus, fitted portion 60 can be efficiently lubricated.

Instead of the above-described example in which lubricating oil supplying member 70 has tubular member 170, lubricating oil supplying member 70 may be formed to have a tubular shape corresponding to tubular member 170, and the tubular member may be formed integrally with lubricating oil supplying member 70.

Description has been given above of the example in which first supplied oil passage 75 which is a path of the lubricating oil flowing inward in the radial direction of input shaft 40, and second supplied oil passage 76 extending in the axial direction of input shaft 40 are formed inside lubricating oil supplying member 70. However, the supplied oil passage formed inside lubricating oil supplying member 70 may extend in any direction as long as the supplied oil passage allows inflow port 74 open to the outer circumferential surface of lubricating oil supplying member 70 and the inner-shaft oil passage to communicate with each other.

Although lubricating oil supplying member 70 and carrier 34 are fixed to oil passage housing 102 and are fixed with respect to rotation axis A, lubricating oil supplying member 70 and carrier 34 may be members that rotate about rotation axis A. However, when lubricating oil supplying member 70 and/or carrier 34 rotate, it is necessary to increase the source pressure of the lubricating oil due to the influence of centrifugal force as described above. Therefore, it is desirable that the rotation speed of lubricating oil supplying member 70 and carrier 34 should be low.

The location of the upstream oil passage which is an oil passage on the upstream side of a flow of the lubricating oil with respect to the supplied oil passage of lubricating oil supplying member 70 is not limited to carrier 34, and the upstream oil passage may be formed inside an arbitrary member. For example, the upstream oil passage communicating with the supplied oil passage may be formed inside the housing.

The lubricating apparatus is not limited to the apparatus for lubricating fitted portion 60 where input shaft 40 and sun gear 31 of planetary gear mechanism 30 are spline-fitted. The lubricating apparatus in the present embodiment may be applied to a spline-fitted portion used in various types of industrial machines where an arbitrary spline shaft having outer spline teeth on an outer circumference at a tip is spline-fitted to an arbitrary tubular member having inner spline teeth fitted to the outer spline teeth on an inner circumference.

Although the embodiment of the present invention has been described above, it should be understood that the embodiment disclosed herein is illustrative and not limitative in any respect. The scope of the present invention is defined by the terms of the claims, and is intended to include any modifications within the scope and meaning equivalent to the terms of the claims.

REFERENCE SIGNS LIST 1 wheel loader; 3 work implement; 21 engine; 24 transmission; 30 planetary gear mechanism; 31 sun gear; 32 planetary gear; 33 ring gear; 34 carrier; 35 shaft; 40 input shaft; 41 tip surface; 42, 52 recessed portion; 43 axial oil passage; 44 radial oil passage; 45, 61g spline groove; 45t outer spline teeth; 60 fitted portion; 61 inner spline teeth; 70 lubricating oil supplying member; 71, 73 protruding portion; 72 coupling portion; 74 inflow port; 75 first supplied oil passage; 76 second supplied oil passage; 77 third supplied oil passage; 84 first upstream oil passage; 85 second upstream oil passage; 86 outflow port; 99 oil feeding pipe; 110 output shaft; 170 tubular member; 181 protruding portion; A rotation axis; M/G motor.

The invention claimed is:

1. A lubricating apparatus lubricating a fitted portion where a shaft member and a tubular member are spline-fitted, the shaft member having outer spline teeth on an outer circumference surface at a tip and being rotatable about a rotation axis, the tubular member having inner spline teeth fitted to the outer spline teeth on an inner circumference, the lubricating apparatus comprising:
   a lubricating oil supplying member disposed to face a tip surface of the shaft member,
   an inner-shaft oil passage being formed inside the shaft member, the inner-shaft oil passage allowing the outer circumferential surface having the outer spline teeth and the tip surface to communicate with each other,
   a supplied oil passage being formed inside the lubricating oil supplying member, a lubricating oil supplied to the inner-shaft oil passage flowing through the supplied oil passage,
   the supplied oil passage being provided with an inflow port, the lubricating oil flowing into the supplied oil passage through the inflow port,
   the inflow port being open to an outer circumferential surface of the lubricating oil supplying member in a radial direction of the shaft member.

2. The lubricating apparatus according to claim 1, wherein the lubricating oil supplying member is fixed with respect to the rotation axis of the shaft member.

3. The lubricating apparatus according to claim 1, further comprising
   an outer member, an upstream oil passage being formed inside the outer member, the lubricating oil supplied to the supplied oil passage flowing through the upstream oil passage, wherein
   the upstream oil passage is provided on an outer side in the radial direction of the shaft member with respect to the fitted portion.

4. The lubricating apparatus according to claim 3, wherein the outer member is fixed with respect to the rotation axis of the shaft member.

5. The lubricating apparatus according to claim 1, wherein
a planetary gear mechanism includes a sun gear, a plurality of planetary gears disposed around the sun gear, and a carrier supporting the planetary gears, and the sun gear of the planetary gear mechanism forms the tubular member, and
an upstream oil passage is formed inside the carrier, the lubricating oil supplied to the supplied oil passage flowing through the upstream oil passage.

6. The lubricating apparatus according to claim 5, wherein
the carrier is disposed such that a central axis thereof is coaxial with the rotation axis of the shaft member, and is fixed in a rotation direction.

7. The lubricating apparatus according to claim 1, further comprising
a protruding portion protruding inward in the radial direction of the shaft member from an inner circumferential surface of the inner-shaft oil passage.

8. The lubricating apparatus according to claim 7, wherein
a length of protrusion of the lubricating oil supplying member from the tip surface of the shaft member into the inner-shaft oil passage is longer than a distance from the tip surface of the shaft member to the protruding portion.

\* \* \* \* \*